(12) United States Patent
Asokan et al.

(10) Patent No.: US 7,149,895 B1
(45) Date of Patent: Dec. 12, 2006

(54) PERSONAL DEVICE, TERMINAL, SERVER AND METHODS FOR ESTABLISHING A TRUSTWORTHY CONNECTION BETWEEN A USER AND A TERMINAL

(75) Inventors: Nadarajah Asokan, Espoo (FI); Herve C. Debar, Adliswil (CH); Michael Steiner, Saarbruecken (DE); Michael Waidner, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/496,065

(22) Filed: Feb. 1, 2000

(30) Foreign Application Priority Data

Feb. 1, 1999 (EP) ................................. 99101966

(51) Int. Cl.
*H04L 9/00* (2006.01)
*H04K 1/00* (2006.01)
*H04K 1/10* (2006.01)
*G06F 7/04* (2006.01)
*G06F 17/30* (2006.01)
*G06K 9/00* (2006.01)
*H04N 7/167* (2006.01)

(52) U.S. Cl. ................ 713/159; 713/168; 726/29; 380/33; 380/234; 705/67

(58) Field of Classification Search ............... 713/169, 713/170, 172, 173, 180, 186, 159, 168; 705/33, 705/41, 67, 73; 380/30, 2.78, 33, 234; 235/380; 726/29

See application file for complete search history.

(56) References Cited

U.S. PATENT DOCUMENTS 4,386,416 A * 5/1983 Giltner et al. ................ 710/68
4,529,870 A * 7/1985 Chaum ........................ 235/380
4,799,061 A * 1/1989 Abraham et al. ........... 340/5.26

(Continued)

FOREIGN PATENT DOCUMENTS

EP 0225010 6/1987

(Continued)

OTHER PUBLICATIONS

Königs, Hans-Peter. "Cryptographic Identification Methods for Smart Cards in the Process of Standardization", published Jun. 1991, IEEE Communications Magazine.*

(Continued)

*Primary Examiner*—Jacques Louis-Jacques
*Assistant Examiner*—Michael J. Simitoski
(74) *Attorney, Agent, or Firm*—Douglas W. Cameron; Anne Vachon Dougherty

(57) ABSTRACT

The invention is related to a system which allows a user to authenticate unknown terminals. The invention uses a first authentication step wherein the terminal authenticates itself to a server. Depending on whether the personal device has its own output means, such as a loudspeaker or a screen, the final message, whether the terminal can be trusted or not, can be output on the personal device or on the terminal itself. In the case where the device has no output means of its own, this message can originate in the device and be transmitted from there to the terminal. The user can input authentication information into his personal device, which can then be fully or partially transmitted to the terminal. In the end, the terminal may use the transmitted information to give out the authenticity output message. After the first authentication step follows a second authentication step, wherein the server authenticates itself to the personal device, if there is one. Upon success of both authentication steps, the authenticity output message can be given to the user.

16 Claims, 5 Drawing Sheets

U.S. PATENT DOCUMENTS

| | | | | |
|---|---|---|---|---|
| 4,868,376 | A * | 9/1989 | Lessin et al. | 235/492 |
| 5,036,461 | A * | 7/1991 | Elliott et al. | 705/44 |
| 5,343,529 | A * | 8/1994 | Goldfine et al. | 705/75 |
| 5,412,192 | A * | 5/1995 | Hoss | 235/380 |
| 5,475,756 | A * | 12/1995 | Merritt | 705/73 |
| 5,651,066 | A * | 7/1997 | Moriyasu et al. | 380/282 |
| 5,668,876 | A * | 9/1997 | Falk et al. | 380/271 |
| 5,729,608 | A * | 3/1998 | Janson et al. | 713/171 |
| 5,737,423 | A * | 4/1998 | Manduley | 705/67 |
| 5,748,737 | A * | 5/1998 | Daggar | 705/41 |
| 5,761,309 | A | 6/1998 | Ohashi et al. | 380/25 |
| 5,793,952 | A * | 8/1998 | Limsico | 726/18 |
| 5,903,882 | A * | 5/1999 | Asay et al. | 705/44 |
| 6,038,551 | A * | 3/2000 | Barlow et al. | 705/41 |
| 6,081,893 | A * | 6/2000 | Grawrock et al. | 713/183 |
| 6,112,078 | A * | 8/2000 | Sormunen et al. | 455/411 |
| 6,343,284 | B1 * | 1/2002 | Ishikawa et al. | 705/67 |
| 6,426,955 | B1 * | 7/2002 | Gossett Dalton, Jr. et al. | 370/401 |
| 6,430,407 | B1 * | 8/2002 | Turtiainen | 455/411 |
| 6,463,418 | B1 * | 10/2002 | Todd | 705/26 |
| 6,510,523 | B1 * | 1/2003 | Perlman et al. | 726/6 |
| 6,529,725 | B1 * | 3/2003 | Joao et al. | 455/406 |
| 6,584,309 | B1 * | 6/2003 | Whigham | 455/414.1 |
| 6,880,079 | B1 * | 4/2005 | Kefford et al. | 713/155 |
| 2001/0034835 | A1 * | 10/2001 | Smith | 713/175 |
| 2002/0062284 | A1 * | 5/2002 | Kawan | 705/43 |

FOREIGN PATENT DOCUMENTS

| | | |
|---|---|---|
| EP | 0566811 | 10/1993 |
| EP | 0660580 | 8/1995 |

OTHER PUBLICATIONS

Asokan, N. et al. "The State of the Art in Electronic Payment Systems", 1997 IEEE.*

Pfitzmann, A. et al. "Trusting Mobile User Devices and Security Modules", Feb. 1997 IEEE.*

Schneier, Bruce. Applied Cryptography, Second Edition, 1996 John Wiley & Sons.*

Weiss, Kenneth P. "When a Password is not a Password", 190 IEEE.*

* cited by examiner

PERSONAL DEVICE, TERMINAL, SERVER AND METHODS FOR ESTABLISHING A TRUSTWORTHY CONNECTION BETWEEN A USER AND A TERMINAL

FIELD OF THE INVENTION

The invention relates to situations where untrusted terminals are used to access a computer system. More particularly, it relates to public untrusted terminals which are connected via a network to a computer system and the authentication of such public untrusted terminals.

AND BACKGROUND OF THE INVENTION

Automatic teller machines (ATM) and Internet kiosks are typical examples or public untrusted terminals which are used to access computer systems. A typical system is illustrated in FIG. 1. Consider withdrawing money from an ATM 6 using a bank card 2. In all existing systems, users 1 have to enter a personal identification number (PIN) or passphrase in order to reliably authenticate themselves to the bank. But there is no way for the user 1 to authenticate the bank. There have been incidents where thieves set up fake ATMs and successfully stole PINs and magnetic stripe information from unsuspecting users.

The same fake terminal problem occurs in many other settings as considered in the following examples.

ATMs and point-of-sale terminals. In both scenarios, every user 1 is registered with a specific server 5 (e.g., a credit-card issuer). All transactions of the user 1 are eventually authorized by the server 5. Servers 5 can typically identify and authenticate legal terminals 6. A typical attack scenario is when the attacker would set up an illegal terminal 6 which waits for the user 1 to type in the PIN code, read any necessary information from the card 2, and then refuse service, for example by displaying a "terminal 6 out of order" message. Unsuspecting user 1 will simply move on to a different terminal 6. The attacker can later use the stolen information at a legal terminal 6.

Public Internet kiosks: Short-term access to the Internet from public terminals is an increasingly common feature in malls, airports, the so-called "Internet cafes," and other public places. There is little risk for users who merely want to "surf" the web from these terminals. But people can, and do, perform more sensitive transactions such as accessing their personal or business computer systems, making payments etc. from public Internet kiosks. This scenario differs from the previous ones in some respects:

the user 1 may access several servers from the same terminal 6, and the types of private information which needs to be protected may not be fixed, or even known a priori.

A similar scenario arises in the case of virtual mall kiosks. Virtual mall kiosks allow prospective customers to browse through and purchase the wares advertised by shop-keepers in the virtual mall. Functionally, this scenario is similar to public Internet kiosks.

In specific settings, such as ATMs that use biometrics instead of password to authenticate, the fake terminal problem can be avoided. However, the general problem remains. A solution to this general problem must take into account different scenarios where the resources available to a user may be different: a user may have a trusted personal device with its own display or may have only a standard integrated chip card (e.g. a smartcard) with no display attached or, in the simplest and most common case, may not have any personal trusted device at all.

The article "Trusting mobile user devices and security modules" in "Computer, innovative technology for computer professionals", Feb. 1997, IEEE Computer Society, pp. 61–67, a simple protocol is described where a user can authenticate a user device with display. It is an object of the present invention to provide a scheme to solve the problems associated with untrusted public terminals.

It is an object of the present invention to provide a scheme for a user to authenticate a public terminal before using it to process sensitive information.

SUMMARY OF THE INVENTION

The foregoing and other objects are accomplished by a device, terminal, server, communication system, and a method, as detailed below. The personal device according to claim 1 offers the advantage that the user can authenticate an unknown and hence untrusted terminal and thereby find out whether the terminal can be trusted or not. When the device comprises stored predetermined authentication information which can be communicated to the terminal, the device need not have an output means for outputting the authenticity output message. The device hereby takes advantage of the output capability of the terminal and the trusted path that has been established before.

Using a third authentication step for the personal device to authenticate itself to the terminal brings in the advantage that not only the device can trust the server and, via the server the terminal, but also the terminal can trust the device. Thus, also the terminal has the possibility to detect a fraudulent device and to interrupt security-sensitive applications upon detection of illegal personal devices.

Using bidirectional authentication steps is advantageous, since then both partied in the authentication can, upon success, trust each other which results in a fully bidirectional trusted channel. Security-sensitive information can hence be exchanged bidirectionally. The third authentication step may then be renounced.

Requesting the user to authenticate himself again is advantageous in that the device also sees whether it can trust the user. Thus, the device also has the possibility to detect a fraudulent user and to interrupt security-sensitive applications upon the detection of an illegal user.

It proves of great practical advantage when the authenticity output message comprises visible and/or audible and/or tactile information, because this a human-interface-readable information which renders recognition of a trusted terminal uncomplicated and fast.

If the authenticity output message comprises at least one value for lookup in a table stored in the terminal, the personal device needs less memory space since a simple reference to a place in the lookup table suffices to identify the correct authenticity output information.

A scenario wherein the authenticity message is communicatable to the terminal by the server, the authenticity output message preferably having been transmitted to the server by the user, refers to a situation when the personal device is not even writable by the user. This opens the invention to the field of prefabricated, non-amendable personal device, such as preprogrammed or prewritten smartcards or magnetic cards.

Higher security can be achieved, when the authenticity output message is communicatable to the terminal by the server upon successful authentication of the device to the server, because the authenticity output message is safe in the server, as long as no authentication has taken place. Hence, no attacker can somehow get the authenticity output message out of the device.

Using only part of the authenticity output message to be presented to the user, the achievable security is again higher, because the user can the same authenticity output message several times without risking that an attacker somehow manages to spy out the output message and use it the next time to cheat on the user by using a fake terminal pretending to be a legal terminal.

The invention is related to a system which allows a user to authenticate unknown terminals. The user can hereby detect if a terminal he wants to use is a fake terminal or if it is a legal terminal and can be trusted. Only trusted terminals should be used to perform security-sensitive actions via the terminal. The invention users a first authentication step wherein the terminal authenticates itself to a server. The authentication is either initiated simply by coupling a personal device to the terminal, or by some additional action performed by the user. The user can, for example, additionally press one or more buttons or keys on the terminal or on the personal device, wherever such input means are present. For authentication, any known authentication system can be used (e.g., using a private-public key system). Depending on whether the personal device has its own output means, such as a loudspeaker or a screen, the final message, whether the terminal can be trusted or not, can be output on the personal device or on the terminal itself. Since the user trusts his personal device, this message preferably should come from the device itself. In the case where the device has no output means of its own, this message can originate in the device and be transmitted from there to the terminal. The user can input authentication information into his personal device, which can then be fully or partially transmitted to the terminal. In the end, the terminal may use the transmitted information to give out the authenticity output message. After the first authentication step follows a second authentication step, wherein the server authenticates itself to the personal device, if there is one. Upon success of both authentication steps, the authenticity output message can be given to the user. If the personal device has no writing capability, the authentication information, also called the authentication vector, can be transferred by the user via a trusted channel to the server. Upon successful authentication, the server can then output some message to the terminal to make it output the authenticity output message. The message from the server to the terminal can therefore be the authenticity output message itself, part of its, or any other kind of message that effects issuance of the authenticity output message to the user. In the case where the user has no own personal device, the method can be used to transmit to the server the authentication vector before approaching the terminal. The user has agreed with the server on one or more tuples of challenge-response authentication vector type. The authentication is performed via the challenge-response principle and upon successful authentication, the server finally issues or has issued the authenticity output message via the terminal. The second message step, i.e., the output of the authenticity output message, is preceded by a first messaging step which comprises the issuance of a message from the server. The message of the first messaging step indicates that the terminal can be trusted.

In any of the embodiments, the messages that are transmitted need not be transmitted in full. It may suffice to send only part of the message or some pointer to it and to have the final authenticity output message or terminal authenticity message be looked up in a lookup table.

DESCRIPTION OF THE DRAWINGS

The invention will now be described with reference to the appended drawings wherein.

DETAILED DESCRIPTION OF THE INVENTION

Figure 1:
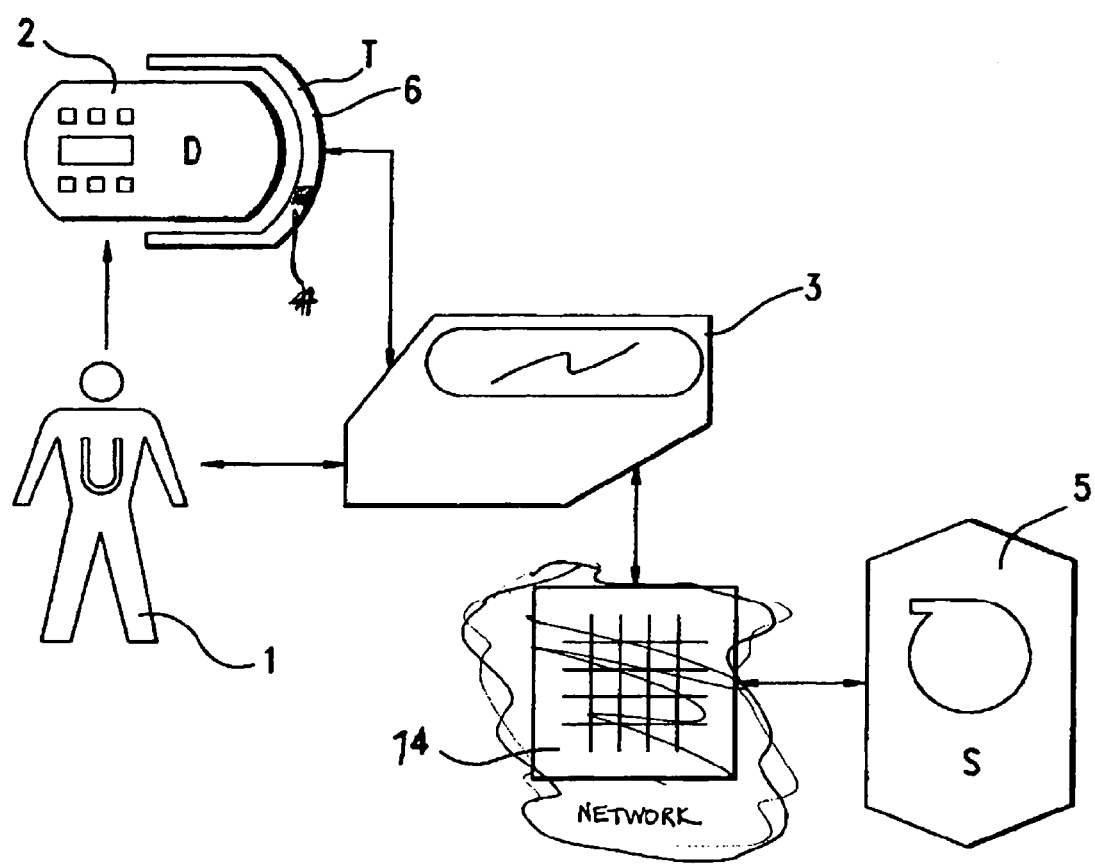
FIG. 1 illustrates an arrangement with a device, a terminal and a server.

In the following, general scheme of the present invention and various exemplary embodiments thereof are described. A typical system in which the present invention can be used is illustrated in FIG. 1. The user 1 accesses a server system 5 from a public untrusted terminal 6. This terminal has a terminal output device 3, such as a screen or the like, via which it communicates with the user. This terminal output device also has means for the user to communicate with the terminal 6, e.g., a keyboard. The terminal 6, respectively terminal output device 3, is connected to the server 5 via a network 14, which in its simplest form can be a direct line. For this purpose of accessing the server, the user 1 has an account on a central server system 5 which he trusts to correctly authenticate a public terminal 6. Public terminals are tamper-resistant but an attacker can easily replace a legal terminal 6 with a fake terminal or install a new fake terminal in a plausible location. The server 5 knows about legal terminals 6 and can authenticate them. Information necessary for a user 1 to authenticate the central server 5 (and, whose necessary, information needed for the central server 5 to authenticate a user 1) is set up during known user registration or other initialization steps (e.g., agreeing on a shared key). Once an entity authenticates another, a confidential, authenticated channel is established as a result. In other words, an attacker cannot hijack a authenticated channel resulting from the authentication procedure. The symbols U, T, and S, are herein used to identify a user 1, a terminal 6, and a central server 5, respectively. When the user 1 has a trusted personal device 2, it is denoted by D. This notation is illustrated in FIG. 1.

The authentication steps mentioned above are implemented using authentication protocols. There are various well-known authentication protocols for performing both one-way and two-way authentication such as Secure Sockets Layer (SSL), KryptoKnight, and Kerberos. Details of SSL are described by Alan O. Freier, Philip Kariton, and Paul C. Kocher in "The ssl protocol: Version 3.0.", Technical report, Internet Draft, 1996 KryptoKnight is addressed by R. Bird, I. Gopal, A. Herzberg, P. Janson, S. Kutten, R. Molva, and M. Yung in "Systematic design of a family of attack-resistant authentication protocols", IEEE Journal on Selected Areas in Communications, Vol. 11, No. 5, pp. 679–693, June 1993, for example, Kerberos is described by John T. Kohl and B. Clifford Neuman in "The Kerberos network authentication service (V5)", Internet Request for Comment RFC 1510, 1993. The solutions herein proposed assume the use of a suitable authentication protocol, which can be one of the above-mentioned protocols, or any other protocol that serves a similar purpose.

The server 5 may be replicated thereby avoiding it from becoming a bottleneck. All copies of the server need to be aware of the up-to-date set of legal terminals and the information necessary to authenticate them. There may also be several servers, each responsible for a separate domain. In this case, it is assumed that the necessary infrastructure, e.g. a public-key infrastructure, for central servers to authenticate each other exists. In either case, the number of terminals is likely to be several orders of magnitude higher than the number of servers.

Personal Device With Built-in Output Capability

Figure 2:
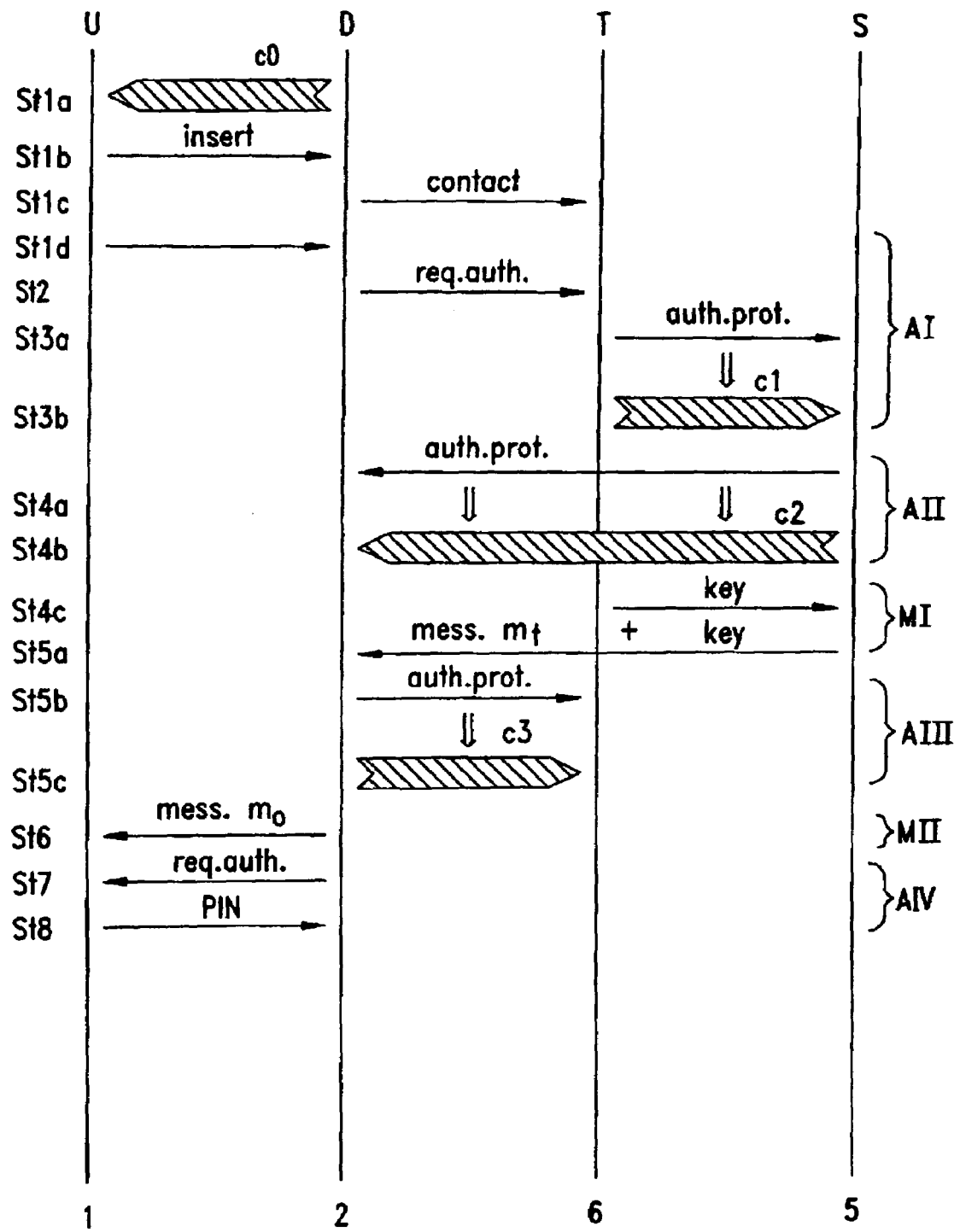
FIG. 2 shows a time scheme of a first method for establishing a trustworthy connection.

First is considered the scenario where the user has a full-fledged trusted personal device 2 with its own output channel, such as a screen of a handheld phone. The terminal 6 cannot access the device 2 output channel. Consequently, the user 1 can be sure that any information communicated to him via this channel does in fact originate from his trusted personal device 2. In other words, there is a trusted path from the trusted personal device 2 to the user 1. When a user 1 (U) walks up to an untrusted terminal 6 (T), he couples his device 2 (D) to the terminal 6 (T) by some means (e.g., infrared link, physical connection) St1b, St1c, and the communication is performed. The corresponding message flows take place as is schematically illustrated in FIG. 2.

First, a first authentication step A1 is performed during which the terminal 6 authenticates itself to the server 5.

1. U→D: U requests D to authenticate the terminal 6 (T) it is attached to (e.g., by clicking on a button on D's display).
2. D→T: D requests T to authenticate itself to S.
3. T→S: T runs a one-way authentication protocol to S. If this succeeds, S knows that it has an authenticated channel S-T to T. Then, a second authentication step A II is performed making use of the first authenticated trusted connection c1.
4. S→D: S runs a one-way authentication protocol to D via S-T. If this succeeds, D knows that it has an authenticated channel S-D to S, which is tunneled through S-T. This authenticated channel S-D is established as a second authenticated trusted connection c2 (St4b). As a next step, a first messaging step M I follows. The terminal sends a session key "key" to the server 5 (St4c). This key can then be used by the server S and the terminal T to exchange information. Since the server trusts the terminal is can accept the key and use it. Using this session key enhances security since an attacker trying to spy on the exchanged information and modify it in between, has neither a chance to read the exchanged information nor to modify it without the modification being detected. Using a session key, i.e., a new key for every new session, which is the uninterrupted use of the described system in exactly one configuration, increases security again, since even a key once spied out by an attacker is useless for the next session.
5. S→D: S sends a message to the effect "T is authentic" via S-D. This message is a terminal authenticity message mt, which arrives at the device 2 via the terminal 6 (St5a). In addition, the server S sends additional information (such as a session key, or one-time certificates) that can be used by D and T to construct a secure channel D-T for a third authentication step A III. In this step, an authentication protocol is run between the device D and T (St5b) and, upon success of the authentication, a secure channel D-T is constructed between themselves (St5c). This authentication channel D-T is established as a third authenticated trusted connection c3 (St5c).
6. D→U: Next follows a second message step M II during which the device D displays a message to the effect "T is authentic according to S" to U. This message is called the authenticity output message mo. The appearing authenticity output message mo tells the user U that he can trust the terminal 6.
7. D→U: In scenarios where the user U has to authenticate to the server S, it can be done in a separate phase following the above example. For that, during a fourth authentication step A IV, the device 2 may request the user 1 to authenticate himself to the device 2 (St7).
8. U→D: The user answers the request by entering a piece of information which is suited to authenticate the user as a legal user. This piece of information is, for example, a personal identification number PIN or a pass phrase (St8).

As mentioned before, there are various well-known authentication protocols that may be used for the one-way authentication flows above (as well as in the scenarios below). In step 3, T could run a two-way authentication protocol. This would foil an attacker masquerading as S. In scenarios where U has to authenticate to S, it can be done in a separate phase following the above exchange, or step 4 can be a mutual authentication exchange. In this case, D may need to ask U to provide authentication information (e.g., a pass-phase or PIN) in step 4. Notice also that so far U is not identified to T or S. This helps to keep the itinerary of U confidential from T.

Figure 3:
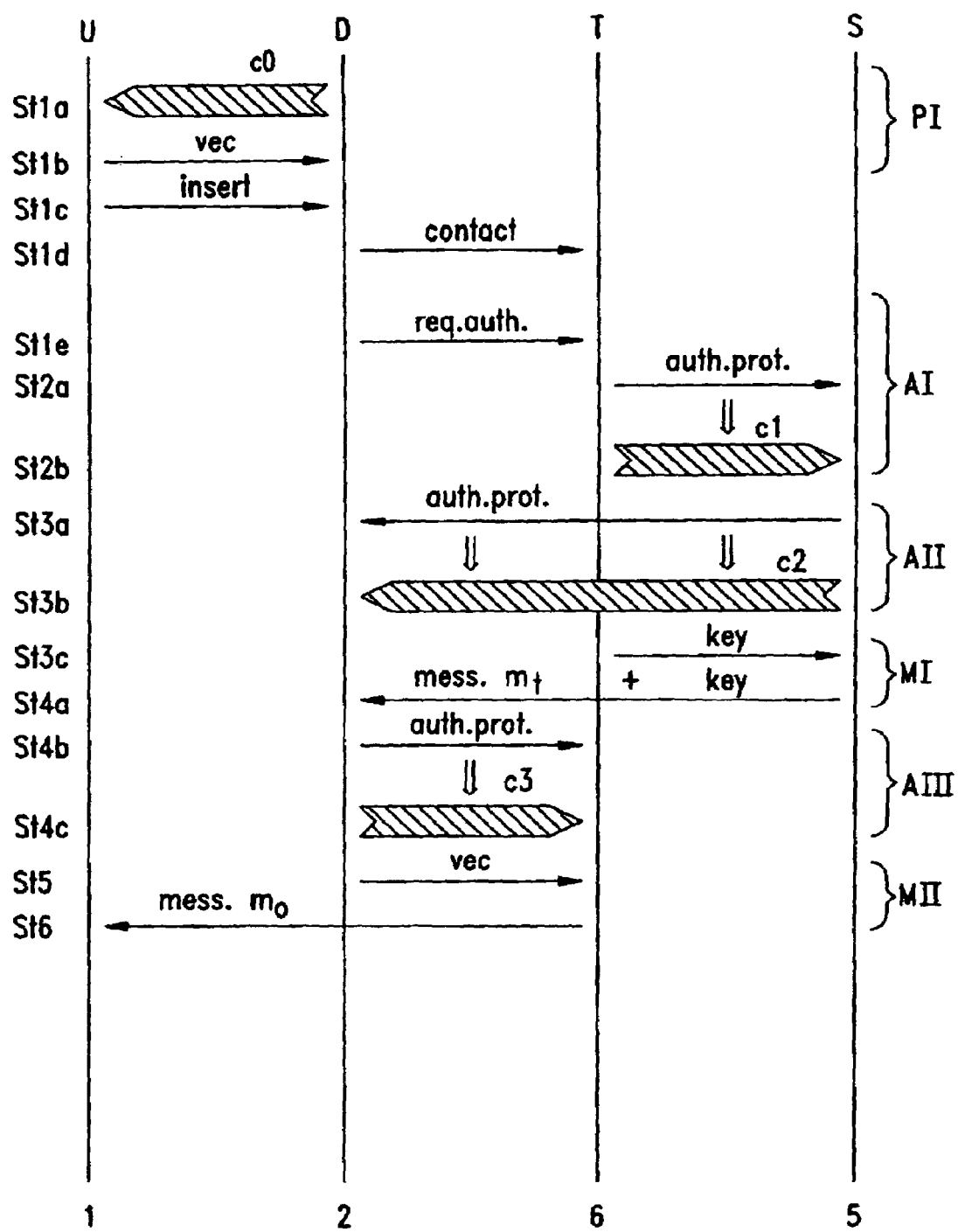
FIG. 3 shows a time scheme of a second method for establishing a trustworthy connection.
Figure 4:
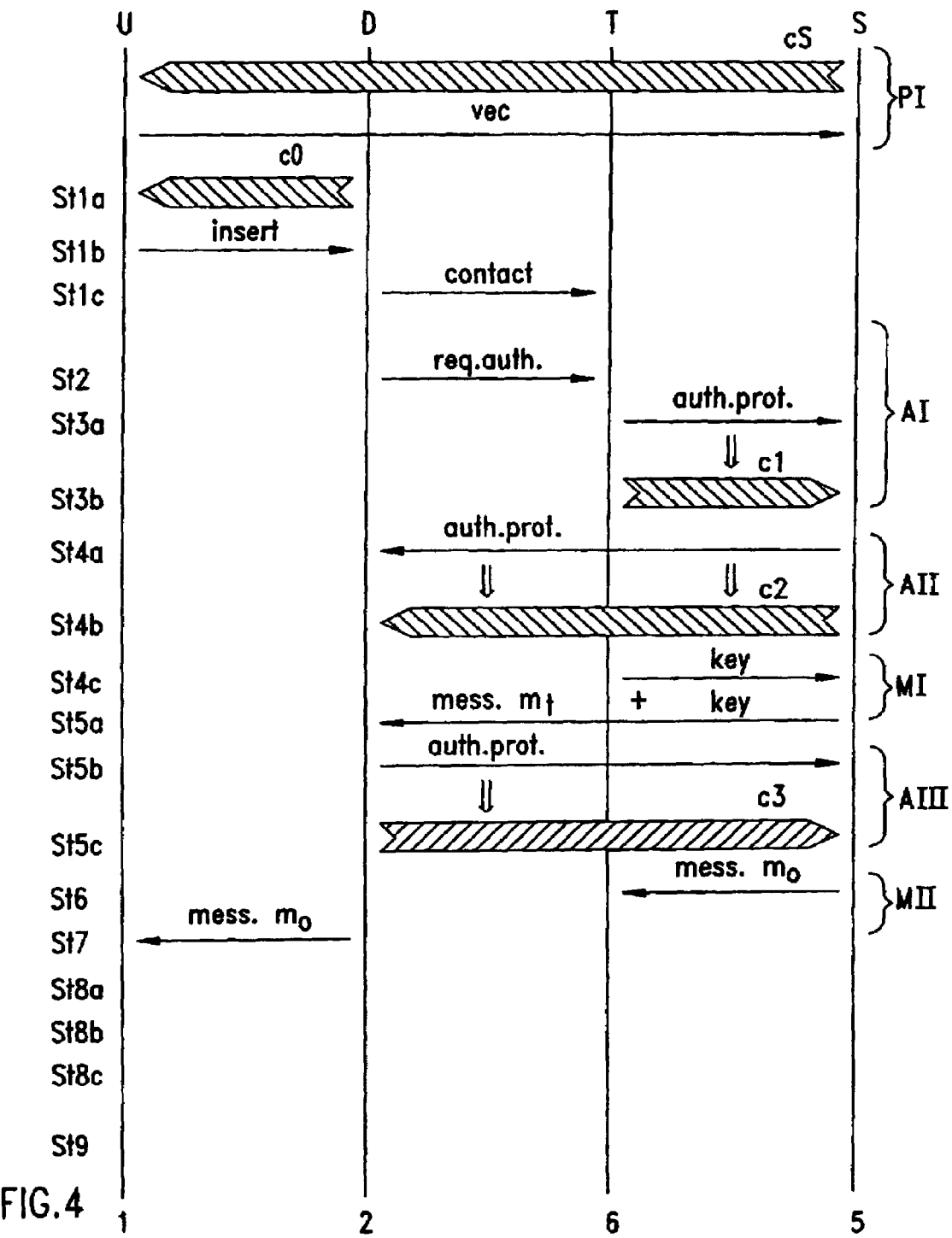
FIG. 4 shows a time scheme of a third method for establishing a trustworthy connection.

As schematically illustrated in FIG. 3, the personal device 2 is equipped with means such that it can be coupled to a terminal 6. If furthermore comprises code which, when being executed in the device 2, performs a method for establishing a trustworthy connection between a user 1 and the terminal 6. This terminal 6 is connected to and authenticatable by at least one server 5 which is authenticatable by the device 2. If the device 2 is coupled to the terminal 6, which coupling may be performed by physical, optical, wire-bound, or wireless means, the following steps are carried out:

A first authentication step AI is initiated during which said terminal 6 authenticates itself to the server 5. Upon success of this initiation, a first authenticated trusted connection c1 is established between said server 5 and said terminal 6.

Then, a second authentication step AII is initiated during which—via said established first authenticated trusted connection C1—the server 5 authenticates itself to the device 2. Upon success of this authentication, a second authenticated trusted connection c2 is established between the server 5 and the device 2.

Then, a terminal authenticity message ($m_c$) is received by the device 2 during a first messaging step MI. This message is received from the server 5 via the established second authenticated trusted connection c2 and confirms the established authenticity of the terminal 6.

Then, during a second messaging step MII, an authenticity output message ($m_c$) is provide by the device 2 to the user 1. This is done via an output of the device 2 and/or via a terminal output 3 of the terminal 6.

The personal device 2 might comprise stored predetermined authentication information (vec) which can be sent to the terminal 6 for it to create the authenticity output message ($m_o$). Usually, the authenticity output message ($m_o$) is sent by the server 5 to the terminal 6. This authenticity output message ($m_o$) might comprise visible, audible, or tactile information (e.g., one or more of the following: background color, foreground color, background pattern, sound, letters, numbers). Likewise, the authenticity output message ($m_o$)

might comprise at least one value for lookup in a table 4 which is stored in the terminal 6, for example. The authenticity output message ($m_o$) might have been transmitted by the user 1 to the server 5. This is preferably done via a trusted communication connection cs. The authentication steps AI, AII, and AIII might be bidirectional.

In the above scenario the terminal 6 has to be able to authenticate itself to the server 5 during the first authentication step AI such that upon success the first authenticated trusted connection c1 is established between server 5 and said terminal 6. Furthermore, the terminal 6 has to facilitate the establishment of the second authenticated trusted connection c2 between server 5 and device 2. For certain implementations the terminal 6 might need a terminal output 3. Furthermore, the terminal might comprise a stored lookup table 4 which is accessible via the authenticity output message ($m_o$).

The server 5 is connected to the terminal 6 via a network or link and is able to authenticate the terminal 6 during the first authentication step AI. After the first authentication step AI a first authenticated trusted connection c1 is established between the server 5 and the terminal 6. The server 5 furthermore has to be enabled to authenticate itself to the device 2 during the second authentication step AII such that the second authenticated trusted connection c2 is established. Then, the server 5 sends the terminal authenticity message ($m_t$) to the device 2 via the established second authenticated trusted connection c2, to confirm the established authenticity of the terminal 6.

Personal Smartcard with Output Capability

Customizing security-critical windows is a well-known security measure against Trojan horse attacks. There have been various proposals. One is described by N. Asokan et al. in "Deliverable D02: Preliminary report on basic services, architecture and design", Technical report, SEMPER Consortium, 1996. This Technical report is a SEMPER Project deliverable which was submitted to the European Commission; See http://www.semper.org for related information. Another proposal was published by J. D. Tygar and A. Whitten in "WWW electronic commerce and Java Trojan horses" in Second USENIX Workshop on Electronic Commerce, pages 243–250, Oakland, Calif., November 1996. Some variants have also been implemented, for example in the SEMPER Trusted INteractive Graphical User INterface (see www.semper.org), or the hieroglyphs in the logic dialog-box of the Lotus Notes software. While it is an effective countermeasure against simple-minded Trojan horses, it is effective in a scenario where the Trojan horse has bread and write access to the display. As soon as a personalized window is displayed to the user, the Trojan horse program can read the personalization information, construct a fake window with the same information on top of the legitimate personalized window.

Hereinafter the personalization idea is combined with authentication protocols to achieve an effective solution for the scenario currently under consideration. In the current threat model, legal terminals are tamper-resistant while illegal terminals will not be able to authenticate themselves to the central server 5. By not revealing the personalization information before the terminal 6 has been authenticated, one can be safe even from sophisticated attacker programs. Herein, the stronger threat model is considered in which an attacker may subvert legal terminals by, for example, installing Trojan horses.

It is assumed that the user 1 has a trusted (home) base (such as a home PC) where he can prepare his device 2 (e.g. a smartcard) before beginning his travel. For the preparation, the user 1 selects an authentication vector. An authentication vector consists of one or more types of authenticators. An authenticator of a particular type is such that it can take one of several values, each different value can be perceived by an unaided human and distinguished from other values.

Examples of types of authenticators are:

background color (of the order of 256 possible values)

foreground color (of the order of 256 possible values)

background pattern (of the order of 16 different patterns)

sound sequence (of the order of 256 different tunes)

Another example is to include text phrases that can be easily recognized by the user 1. A variety of means could be employed in order to show the words to the user 1: e.g., visual (by printing them on a screen), aural (by using a speech synthesizer) or tactile (by "displaying" the words in braille). Words and phrases constitute the most powerful type of authenticators since (a) they can be drawn from a relatively large space, and (b) they can be communicated to the user 1 in a variety of ways.

The steps performed for authenticating an untrusted terminal 6 to the user are depicted in FIG. 3.

The trusted home base here constitutes the trusted path c0 (St1a) between the device 2 and the user 1. The user 1 hence trusts his device 2. To prepare for his travel, the user 1 performs a preparation step P I in which he picks one combination as the predetermined authentication information vec: for example, a tuple of the form phase=abracadabra, background-color=blue, foreground-color=white, background-pattern=grid, tune=jingle-bells on this trusted home base and stores it on the smartcard 2 (St1b). When the user 1 walks up to an untrusted terminal 6 and inserts his smartcard 1 into the terminal's reader (St1c, St1d), the following message flows take place:

1. U→T: U requests T to authenticate itself to S (e.g., by typing in the identifier of S and clicking on a button on T's display).
2. T→S: T runs a one-way authentication protocol to S. If this succeeds, S knows that it has an authenticated channel S-T to T. This authenticated channel S-T is established as the first authenticated trusted connection c1 (St2b). The server S hence trusts the terminal 6. Then, a second authentication step A II is performed making use of the first authenticated trusted connection c1.
3. S→D: S runs a one-way authentication protocol to D via S-T. If this succeeds, D knows that it has an authenticated channel S-D to S which is tunneled through S-T. This authenticated channel S-D is established as a second authenticated trusted connection c2 (St3b). As a next step, a first messaging step MI follows. The terminal sends a session key "key" to the server 5 (St3c).
4. S→D: S sends a message to the effect "T is authentic" via S-D. This message is the terminal authenticity message mt, which arrives at the device 2 via the terminal 6 (St4a). In addition, the server S sends additional information (such as a session key, or one-time certificates) that can be used by D and T for a third authentication step A III. In this step, an authentication protocol is run between the device D and T (St4b) and, upon success of the authentication, a secure channel D-T is constructed between themselves. This authenticated channel D-T is established as a third authenticated trusted connection c3 (St4c).
5. D→T: Next follows the second messaging step M II during which the device D transmits a message to the effect "T is authentic according to S" to the user. Since the device has no display, it takes advantage of the display of the terminal 6. The device D reveals the pre-selected authentication vector to T (St5).

6. T→U: T shows the received authentication vector to U (e.g., by displaying the selected colors and background pattern, and playing the selected tune). This output information constitutes the authenticity output message $m_o$. The appearing authenticity output message $m_o$ tells the user U that he can trust the terminal 6.

In other words, D reveals the authenticator to T only after S has certified that T is a legal terminal 6. The probability of an illegal terminal correctly guessing the authenticator of a user 1 is very small (e.g., of the order of one in 256×256× 16×256 with the parameters suggested above). If a rogue terminal incorrectly guesses the authenticators of several users in close succession, it will likely be reported to the authorities and thus detected as an illegal terminal.

Notice that so far U is not identified to T or S. This helps to keep the itinerary of U confidential from T.

The following variations are possible: Smartcards may not have sufficient memory to store an authenticator in its entirety. However, if the types of authenticators are predefined, the smartcard needs to store only an index and the terminal 6 can use the index to look up the authenticator in a table 4 of all possible values for the different components.

Non-writable Personal Smartcard Without Output Capability

Some smartcards may not be writable by the user 1. In this case, the following modifications are made:

1. during a preparation phase P1, the user 1 selects the authentication vector and communicates it to the server 5 via a confidential, authenticated channel cS from his home base. As the authentication vector, respectively as the predetermined authentication vector vec, the user 1 picks one combination of, for example a tuple comprising phrase=abracadabra, background-color=blue, foreground-color=white, background-pattern=grid, tune=jingle-bells. Furthermore, still the trusted path c0 (St1a) between the device 2 and the user 1 exists. The user 1 hence trusts his device 2. When the user 1 walks up to the untrusted terminal 6 and inserts his smartcard 1 into the terminal's reader (St1b, St1c), the following message flow takes place:

2. D→T: In the first authentication step A1, D requests T to authenticate itself to the server S (St2). This request is automatically induced by the insertion of the device D.

3. T→S: The terminal T runs a one-way authentication protocol to the server S (St3a). If this succeeds, the server S knows that is has an authenticated channel S-T to T. This authenticated channel S-T is established as the first authenticated trusted connection c1 (St3b). The server 5 hence trusts the terminal. Then a second authentication step A II is performed making use of the first authenticated trusted connection c1.

4. S→D: The server S runs a one-way authentication protocol to the device D via the authenticated channel S-T (St4a). If this succeeds, the device D knows that it has an authenticated channel S-D to the server S which is tunneled through the authenticated channel S-T. This authenticated channel S-D is established as a second authenticated trusted connection c2 (St4b). As a next step, a first messaging step MI follows. The terminal sends a session key "key" to the server 5 (St4c).

5. S→D: The server sends a message to the effect "T is authentic" via S-D. This message is the terminal authenticity message mt, which arrives at the device 2 via the terminal 6 (St5a). In addition, the server S here sends additional information, such as the session key "key" or one-time certificates, that are used by the device D and T for a third authentication step AIII. In this step, an authentication protocol is run between the device D and T (St5b) and upon success of the authentication, a secure channel D-T is constructed between them. This authenticated channel D-T is established as a third authenticated trusted connection c3 (St5c).

6. S→T: Next follows the second messaging step M II during which the server S transmit a message to the effect "T is authentic according to S" to the user U. Since the device D has no display of its own, the server takes advantage of the display of the terminal 6. The device D reveals the pre-selected authentication vector, respectively the predetermined authentication information vec to the terminal T (St6). This output information constitutes the authenticity output message mo.

7. T→U: T shows the received authenticity output message to the user U, respectively display the authenticity output message mo, or part of it, on its terminal output device 3, e.g., by displaying the selected colors and background pattern and playing the selected tune. The appearing authenticity output message tells the user U that he can trust the terminal 6.

The authentication step is step 5 is necessary because S must not reveal the authentication vector to an attacker who is using a legal terminal 6 but pretends to be a user 1 (U). The same authentication vector could be used several times. The user 1 could also select a set of authentication vector during the preparation phase. Another variation is where the user 1 challenges T to show a different component of the authentication vector each time. This will also help foil an attacker who watches a legitimate user 1 and learns his authentication vector. As before T could run a two-way authentication protocol with S (Step 2). This would foil an attacker masquerading as S.

No Personal Device

Smartcards and other personal trusted devices may become commonplace in the near future. But to date, their use is still limited. Most users are armed only with simple pass-phrases (e.g., in the case of Internet access) or memory cards (e.g., in the case of credit/debit cards). In this section, we investigate the scenario in which the user 1 has no personal computing device 2 at all. The corresponding steps are depicted schematically in FIG. 5.

A solution for one way authentication called S/Key, as described by N. Haller in "The S/Key one-time password system", Symposium on Network and Distributed Systems Security, Catamaran Hotel, San Diego, Calif., February 1994. Internet Society. This document is incorporated in its entirety. In the S/Key system, the server 5 issues a number of challenge/response pairs to the user 1 during an initialization stage. The user 1 prints out the list of these pairs. The responses are essentially one-time passwords. In order to access the system, the user 1 identifies himself and the server 5 sends a challenge. The user 1 then looks up the appropriate response from his printed list, sends it back to the server 5, and strikes off that pair from his list. It is proposed to use an S/Key like system in both directions.

Before beginning his travel, S sends a number of challenge/response pairs to the user 1 via a confidential, authenticated channel to his home base and the user 1 selects a different authentication vector for each challenge and sends them back to S. The user 1 also prints out the entire list of <challenge, response, authentication vector> triples. When the user 1 walks up to an untrusted terminal 6, the following message flows take place (cf. FIG. 5):

1. U→T: In the first authentication step AI, the user U requests T to authenticate itself to S (e.g., by typing in the identifiers of U and T, and clicking a button) (St1).
2. T→S: T runs a one-way authentication protocol to S. If this succeeds, S knows that it has an authenticated channel S-T to T. This authenticated channel S-T is established as the first authenticated trusted connection c1 (St2b). The server hence trusts the terminal 6. Then a second authentication step A II is performed making use of the first authenticated trusted connection c1.
3. S→T: S sends one of the challenges, previously exchanged with the user U during a preparation phase P1 via S-T to T (St3).
4. T→U: T displays the challenge to U (St4).
5. U→T: U looks up the response corresponding to the challenge on his printout and types it in, provided it is not already struck off (St5).
6. T→S: T sends the response via S-T to S (St6).
7. S→T: If the response is valid, S looks up the authentication vector corresponding to the challenge, and sends it via S-T to T (St7).
8. T→U: T shows the received authentication vector to U St8).

The user U can verify if this is indeed the authentication vector corresponding to the challenge, according to his printed sheet. If so, he can be confident that T is a legal terminal 6. The user U then strikes off the entry corresponding to the challenge from his printed list. If the authentication fails, U as well as S should still cross out the entry corresponding to that challenge and never use it again. As before T could run a two-way authentication protocol with S (step 2). This would foil an attacker masquerading as S.

Variations of this scheme are addressed below.

The user 1 may want to avoid carrying around a printed list. It can also be a security weakness: if the attacker manages to get hold of the printed list, he can fool the user 1 and/or the central server 5. In this case, he can make do with a single authentication vector. Steps 3–6 are dropped. In step 7, S sends the authentication vector to T without any further checks. This simplification is not secure against targeted attacks where the attacker obtains the authentication vectors of specific users (e.g., by interacting with a legal terminal, setting up a fake terminal 6, and waiting for these users to come in). But it is useful against untargeted attacks (i.e., setting up a fake terminal 6 without specific users in mind). If users change their authentication vectors regularly, large scale targeted attacks are not feasible.

The authenticity message can, in principle, also have been transmitted to the user by the server.

A second variation is, as in the previous scenario, the user 1 can be allowed to challenge T to show a different component of the authentication vector each time: i.e., the user 1 specifies the type of the authentication vector as the challenge since it may help the user 1 remember the challenges. For example, it is easier for a user 1 to remember a color, a tune, and a word rather than to remember three colors.

Note that a user 1 need not necessarily remember his entire authentication vector, but need only be able to recognize incorrect authentication vectors. One possibility to construct authentication vectors with high entropy is to arrange them by themes. For example, the user 1 could issue a challenge on the theme "car," and ask for specific attributes of his car. A car has several attributes which are easy to recognize.

Figure 5:
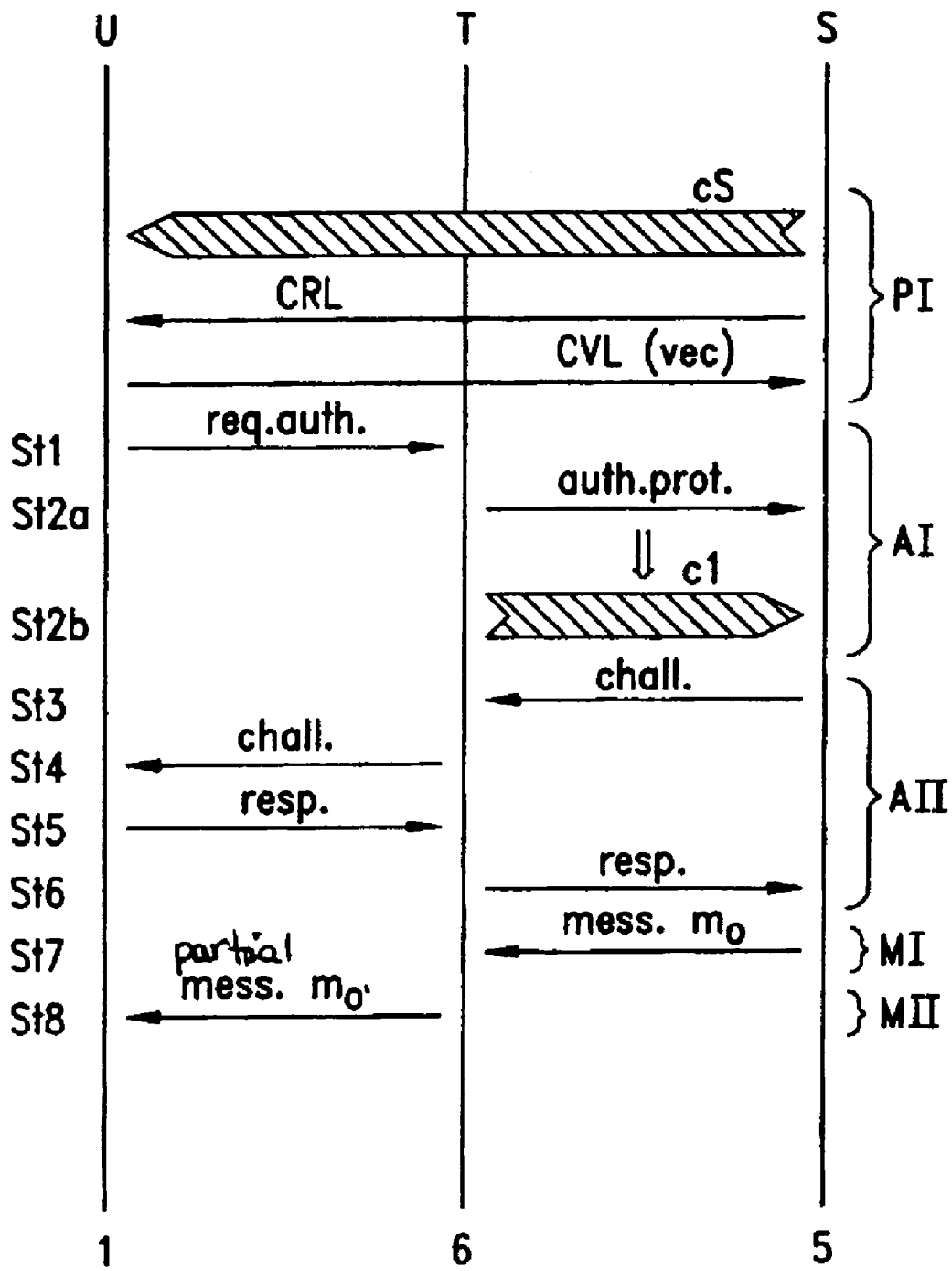
FIG. 5 shows a time scheme of a fourth method for establishing a trustworthy connection.

The foregoing approach can be summarized as follows (details are schematically illustrated in FIG. 5):

(a) a first authentication step AI is executed during which the terminal 6 authenticates itself to the server 5. Upon success of the first authentication, a first authenticated trusted connection c1 is established between the server 5 and the terminal 6;

(b) during a second authentication step AII a challenge is received from the server 5 and output to the user 1;

(c) next, a response is received from the user 1 and transmitted to the server 5. During a first messaging step M I an authenticity output message ($m_o$) is received at the terminal 6;

(d) during a second messaging step MII the authenticity output message ($m_o$) is communicated at least partially to the user 1 via an output 3 of the terminal 6.

The above-described approaches depend on the level of computational resources available to the user. It has been demonstrated that in most cases untrusted terminals can be authenticated and secure sessions established between the user and some remote server system for the exchange and/or processing of sensitive information.

Those skilled in the art will recognize that many modifications and changes can be made to the particular embodiments described above without departing from the spirit and scope of the invention.

The invention claimed is:

1. A server being equipped for establishing a trustworthy connection between a user and a terminal via a user input device, the server comprising:
   a communication component for establishing and conducting communications along a first trusted connection between the server and the terminal and along a second trusted connection between the server and said user input device;
   receiver means for receiving at least one authentication request from said terminal based on user input to said terminal;
   at least one authentication component for verifying the authenticity of the terminal; and
   a message generation component for generating at least one user-specific terminal authenticity output message in response to said user input for delivery to said user input device along said second trusted connection without delivery of said message along the first trusted connection between the terminal and the server.

2. The server according to claim 1 further comprising a session key creation component for creating a session key to be communicated to said terminal.

3. The server according to claim 1 further comprising at least one storage location for storing at least one user-specific authenticity output message and wherein said message generation component accesses the stored at least one user-specific authenticity output message for display to the user at said terminal.

4. A method for establishing a trustworthy connection between a user via a personal user device and a terminal which is connected to and authenticatable by at least one server which is authenticatable by said user device, the method comprising:
   said server authenticating said terminal in response to user input at said terminal;
   establishing a first authenticated trusted connection between said server and said terminal upon success of said authenticating;
   said server authenticating itself to said user device;

establishing a second trusted connection between said server and said user device; and said server providing, in response to said user input, a terminal authenticity message to said user device via said established second trusted connection confirming the established authenticity of said terminal without communicating the terminal authenticity message along the first connection between the terminal and the server.

5. The method according to claim 4 further comprising communicating a user-specific terminal authenticity message to said user.

6. The method according to claim 5 wherein said communicating comprises displaying said message by said device.

7. The method according to claim 6 wherein the device outputs the terminal authenticity message including at least one of visible, audible and tactile information.

8. The method according to claim 7 wherein the message is output only partially by the device, according to a preselection by the user.

9. The method according to claim 5 wherein stored predetermined authentication information (vec) is communicated from the device to the terminal for creating there an authenticity output message ($m_o$).

10. The method according to claim 4 wherein said providing a terminal authenticity message comprises accessing at least one stored user-specific message.

11. The method according to claim 4 wherein said providing a terminal authenticity message comprises exchanging a predetermined set of messages with said user.

12. The method, according to claim 4 further comprising the device authenticating itself to the terminal.

13. The method according to claim 4 further comprising the device requesting that the user authenticate himself.

14. The method according to claim 4 further comprising authenticating the device to the server.

15. The method according to claim 4 further comprising authenticating the user.

16. A program storage device readable by machine, tangibly embodying a program of instructions executable by the machine to perform method steps for a server to establish a trustworthy connection between a user via a user device and a terminal, said method steps comprising:

said server authenticating said terminal in response to user input at said terminal;

establishing a first authenticated trusted connection between said server and said terminal upon success of said authenticating;

said server authenticating itself to said user device;

establishing a second trusted connection between said server and said user device; and said serving providing, in response to said user input, a terminal authenticity message to said user device via said established second trusted connection confirming the established authenticity of said terminal without communicating the terminal authenticity message along the first connection between the terminal and the server.

* * * * *